(12) United States Patent
Jachuck et al.

(10) Patent No.: US 8,003,059 B2
(45) Date of Patent: Aug. 23, 2011

(54) CONTINUOUS PROCESSING REACTORS AND METHODS OF USING SAME

(75) Inventors: Roshan J. J. Jachuck, Massena, NY (US); Supriya Jachuck, Massena, NY (US)

(73) Assignee: R3 Fusion, Inc., Troy, NY (US)

( * ) Notice: Subject to any disclaimer, the term of this patent is extended or adjusted under 35 U.S.C. 154(b) by 242 days.

(21) Appl. No.: 12/467,439

(22) Filed: May 18, 2009

(65) Prior Publication Data
US 2010/0288640 A1    Nov. 18, 2010

(51) Int. Cl.
*B01J 19/00* (2006.01)
*B01J 14/00* (2006.01)
*F27B 15/14* (2006.01)
*F27B 15/16* (2006.01)
*F27B 15/00* (2006.01)
*B01J 19/24* (2006.01)
*B01J 19/18* (2006.01)

(52) U.S. Cl. ........ 422/198; 422/129; 422/202; 422/203; 422/146; 422/149; 422/224

(58) Field of Classification Search .......... 422/129, 422/187, 198, 202, 203, 211, 145, 146, 149, 422/139, 140, 205, 234, 225; 204/519; 210/149, 210/640, 642, 643, 742
See application file for complete search history.

(56) References Cited

U.S. PATENT DOCUMENTS

| | | | |
|---|---|---|---|
| 4,311,570 A * | 1/1982 | Cowen et al. | 204/157.41 |
| 5,855,680 A | 1/1999 | Soininen et al. | |
| 7,122,149 B2 | 10/2006 | Li et al. | |
| 7,531,096 B2 | 5/2009 | Yarbrough et al. | |
| 7,708,952 B2 * | 5/2010 | Chen et al. | 422/129 |
| 2007/0125719 A1 | 6/2007 | Yarbrough et al. | |

OTHER PUBLICATIONS

International Search Report based on PCT/US10/35128 mailed Jul. 12, 2010.

* cited by examiner

*Primary Examiner* — Walter D Griffin
*Assistant Examiner* — Natasha Young
(74) *Attorney, Agent, or Firm* — Greenberg Traurig, LLP; Chinh H. Pham

(57) ABSTRACT

A system having a reactor for continuous processing of fluid is provided herein. The reactor, in general, includes an outer vessel to accommodate fluids to be processed or used in connection therewith, an inner vessel situated within the outer vessel to serve as an energy exchange surface, and an annular space defined between the outer and inner vessels and along which processing of the fluids can be implemented. The continuous thin film reactor can be used to perform, for example, distillation and evaporation, fluid-fluid or solid-fluid-fluid reactions, organic reactions, cooling, and desalination.

49 Claims, 9 Drawing Sheets

CONTINUOUS PROCESSING REACTORS AND METHODS OF USING SAME

TECHNICAL FIELD

The present invention relates processing reactors, and more particularly, to continuous processing reactors that can impart fluid being processed with high heat transfer, mass transfer, mixing rates, and other high transport rates.

BACKGROUND ART

A common problem in chemical reaction processes is how to achieve the proper hydrodynamics in the reactor to efficiently produce the desired products. The reactants need to be mixed so that the molecules of the reaction components come into contact with the other components in the reaction including catalysts. The presence of a gaseous reactant can further require an increase in the surface area of the boundary between the gas and the liquid components to increase the efficiency of the reaction.

To improve mixing and contact between the reaction components, thin film reactors have been designed to include, among other things, a coating of a catalyst to the inner surface (i.e., treatment surface) of the treatment chamber. In addition, to enhance the adhesion of the catalyst to the treatment surface of the treatment chamber, sol-gel or washcoating can be applied to the treatment surface. However, over time, the coating tends to suffer from attrition and inevitably deactivate.

To address the need for an increase in surface area between the components, certain thin film reactors have been designed to include a rotating distributor that can be used to dispense the material, such as a fluid, to be treated onto the inner wall. However, because these reactors combine high-intensity heat exchange and short time of residence of materials to be treated, such a design can cause the materials, as the materials enters the treatment chamber, to quickly expand due to a sudden temperature differential between the treatment chamber and the source, resulting in an uneven spread of the material onto the inner wall of the treatment chamber.

Other thin film reactors have been provided with one or more rotating wipers that can be applied to the inner wall of the treatment chamber to distribute the materials to be treated onto the inner wall (i.e., treatment surface). However, the direct contact of the wipers on the treatment surface can result in contamination of the material, as well as undesirable wear on the wipers and the inner wall of the reactor. Moreover, because of the necessary location of the wipers, obtaining a uniform thin film along substantially the entire length of the inner wall of the treatment chamber remains an issue. In the presence of a viscous fluid, accumulation of material may result due to the non-uniform flow. When that occurs and the accumulated material contacts the wipers, the rotating system may lose its mechanical balance and rotation may be compromised.

Thin film reactors have also been provided with a rotating disc from which fluid to be processed is distributed onto the treatment surface of the treatment chamber. Unfortunately, such reactors are not designed to provide sufficiently long residence time and are not suitable for high throughputs. Furthermore, the current design for thin film reactors may be such that these thin film reactors lack the ability to provide high transport rates, that is, relatively high thermal transfer, mass transfer, or mixing rates, or a combination thereof, in connection with the fluid being processed.

Accordingly, there is a need for a thin film reactor with a design that can provide substantially uniform thin distribution of the fluid or material to be treated onto the treatment surface, that can enhance mixing and/or contact between the reaction components, that can provide a sufficiently long residence time, and that can provide relatively high transport rates, while providing high throughputs.

SUMMARY OF THE INVENTION

In accordance with one embodiment of the present invention, there is provided a reactor for processing fluid. The reactor includes an outer vessel having an inner surface against which a fluid being processed can be accommodated. The inner surface of the outer vessel, in an embodiment, may be designed to allow fluid being processed to descend in a substantially uniform thin film, so as to permit the fluid being processed to have a relatively high rate of thermal transfer, mass transfer, mixing, other transport rates or a combination thereof. The inner surface of the outer vessel may also be provided with a profiled pattern to create additional surface area over which the fluid being processed can flow to facilitate one of treatment, processing, separation, increase in residence time, or a combination thereof. The reactor also includes an inner vessel, situated within the outer vessel, and having an outer surface serving as a heat exchange surface for the fluid being processed. The inner vessel, in one embodiment, includes an inner surface against which a heat exchange fluid may flow. The heat exchange fluid, in general, has a temperature that may be different from that of the fluid being processed to impart a temperature differential between the outer surface of the inner vessel and the inner surface of the outer vessel. The reactor further includes an annular space defined between the outer vessel and the inner vessel for providing a pathway along which processing of the fluid can be implemented. The annular space, in an embodiment, may be designed to maintain a temperature differential between the outer vessel and the inner vessel to impart the fluid being processed with relatively high transport rates. In addition, the annular space may accommodate a second fluid for interaction with the fluid being processed. In one embodiment, the second fluid may move within the annular space in a counter-current manner relatively to the flow of the fluid being processed. A bed of packing material may also be provided within the annular space to increase surface area over which a volume of the fluid being processed can contact for enhancing its transport rates, and to provide a substantially uniform temperature distribution across the annular space.

In another embodiment of the present invention, there is provided a method for processing a fluid. The method includes initially introducing a fluid being processed into an outer vessel and against its inner surface. In this step, a substantially uniform thin film flow of the fluid being processed may be provided against the inner surface of the outer vessel to enhance ability of the fluid to be treated, processed and/or separated, as well as to permit the fluid being processed to have a relatively high rate of thermal transfer, mass transfer, mixing or a combination thereof. In one embodiment, the fluid to be processed may be dispensed in a rotational manner, so as to generate substantially fine droplets or fiber-like elements on to the inner surface of the outer vessel. The method also includes providing, within the outer vessel, an inner vessel with a heat exchange surface at a temperature different than that of the fluid being processed. In this step, a heat exchange fluid, being provided at a temperature different than that of the fluid being processed, may be distributed against an inner surface of the inner vessel. The distribution of the heat exchange fluid may be in a rotational manner, so as to generate substantially fine droplets or fiber-like elements on to the inner surface of the inner vessel. The method further includes maintaining a temperature differential across a pathway between the outer vessel and the inner vessel to impart to the fluid being processed therein relatively high transport rates. The step of maintaining, in an embodiment, includes providing the pathway with a relatively short distance between the outer surface of the inner vessel and the inner surface of the outer vessel. In addition, a second fluid may be directed into the pathway and permitted to interact with the fluid being processed. In one embodiment, the second fluid may be allowed to move in a counter-current manner relative to the flow of the fluid being treated. To the extent desired, a bed of a packing material may be placed within the pathway to increase surface area over which the fluid being processed can contact for enhancement of transport rates. In such an embodiment, a volume of the fluid being treated may be introduced into the outer vessel and into the pathway.

The reactor and method of processing of the present invention can be utilized for a variety of applications, including fluid-fluid or solid-fluid-fluid interactions in connection with organic systems, distillation and evaporation, deheating superheated steam, ultraviolet and/or microwave initiated reactions, desalination, and removal of carbon dioxide, among others.

The reactor of the present invention may also be arranged in series to permit multiple passes of the fluid being processed through each of the reactors to enhance transport rates. If desired, each reactor in the system may be designed for a different function. The reactor of the present invention, alternatively, may include a third vessel within the inner vessel to provide another annular space between the third vessel and the inner vessel, so as to permit multiple passes of the fluid being treated through such a reactor. Additional vessels may further be provided, each being successively positioned within the previous inner vessel, if so desired.

DESCRIPTION OF SPECIFIC EMBODIMENTS

In accordance with one embodiment of the present invention, there is provided a processing system having a reactor for continuous processing of materials. The reactor can provide the materials being processed with a sufficiently long residence time so as to enhance mixing and/or contact between reaction components, and can provide relatively high transport rates, while providing high throughputs.

The reactor, in general, includes an outer vessel to accommodate materials (e.g., fluids and/or solids) to be processed or used in connection therewith, an inner vessel situated within the outer vessel to serve as an energy exchange surface, and an annular space defined between the outer and inner vessels and along which a temperature differential can be provided to impart relatively high transport rates, while providing high throughputs in connection with the materials being processed.

Reactor

Figure 1:
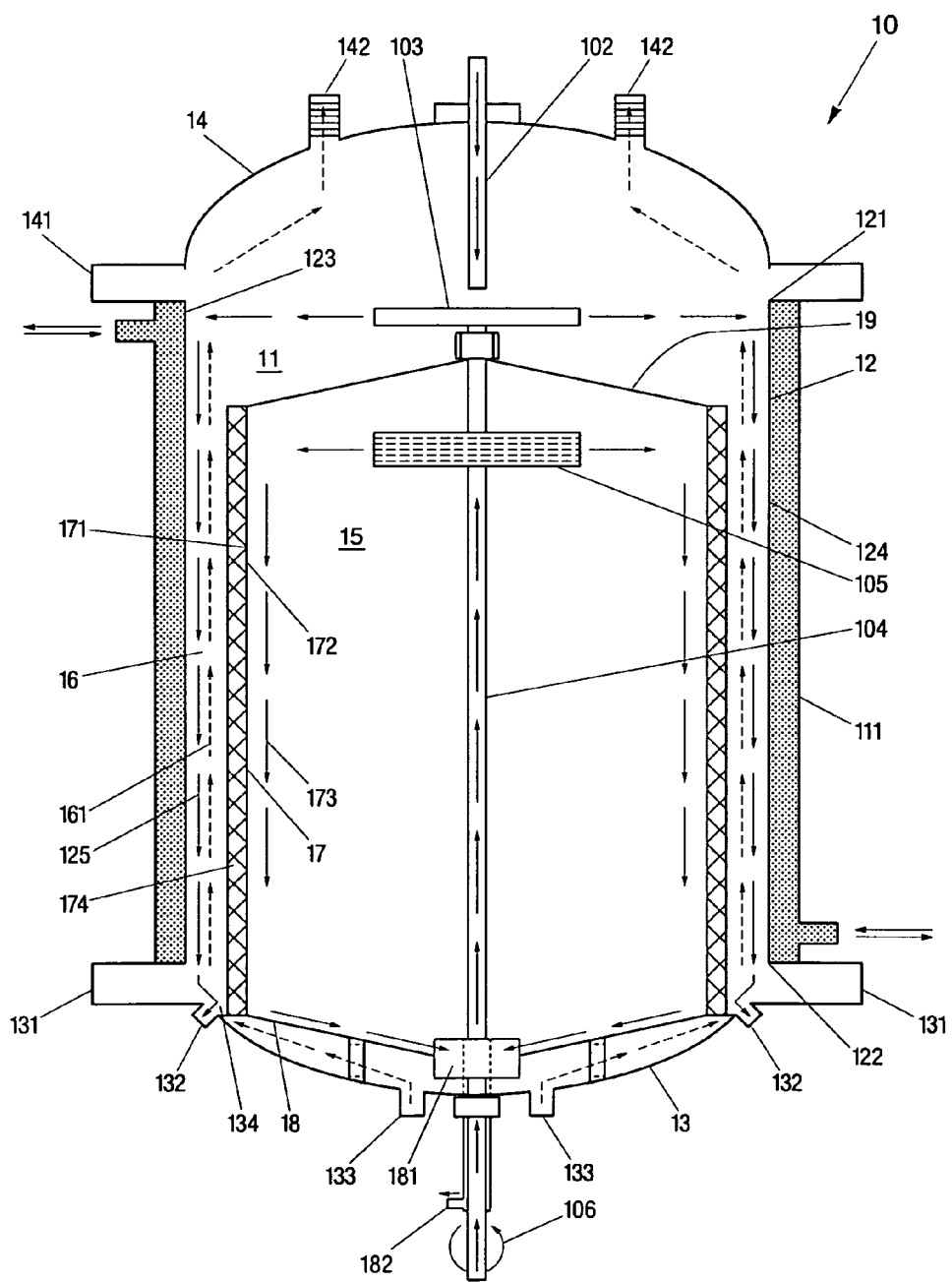
FIG. 1 illustrates a longitudinal sectional view of a processing system having a continuous reactor for providing fluid-fluid or solid-fluid-fluid reactions in accordance with one embodiment of the present invention.

Looking now at FIG. 1, in accordance with one embodiment, the processing system of the present invention may be provided with a reactor 10 for, among other things, continuous processing. As illustrated, reactor 10 includes an outer vessel 11 for accommodating fluids to be processed. The outer vessel 11, in an embodiment, includes a body portion 12 within which a fluid or fluids to be processed may be accommodated, and if desired, any material to be used in connection therewith. In one embodiment, the body portion 12 may be substantially cylindrical in shape and may include a top end 121 and a bottom end 122. The body portion 12 may also include an inner surface 123 (i.e., treatment surface) and an opposing outer surface 124 extending between top end 121 and bottom end 122 of the body portion 12. The inner surface 123, in an embodiment, may be designed so that a fluid being processed may be placed against or thereonto. In one embodiment, the fluid being processed may be permitted to flow down along the length of the inner surface 123, in the direction of arrows 125, in a substantially uniform thin film. The substantially uniform flow of fluid along inner surface 123, in an embodiment, may be facilitated, for instance, by gravitational force. By allowing the fluid to flow substantially uniformly as a thin film, the fluid can be well suited for treatment, processing, and/or separation at a relatively high level of energy efficiency, while imparting the fluid with relatively high transport rates (i.e., thermal transfer, mass transfer and/or mixing rates). In accordance with one embodiment of the present invention, the thin film flow provided on the inner surface 123 of the outer vessel 11 may have a thickness ranging from approximately 1.0 micron to approximately 1.0 cm. However, it should be appreciated that a thickness less than the range provided or more than the range provided is also contemplated, depending on the particular application, as the reactor 10 of the present invention is not intended to be limited in this manner.

As the outer vessel 11 may be designed to impart to the fluid being processed with relatively high transport rates, to the extent that there may be a desire to further enhance thermal transfer, mass transfer, mixing rates and/or other related high transport rates, the inner surface 123 may be profiled to create additional surface area over which the fluid being processed can flow. In particular, by providing additional surface area over which the fluid can flow, the residence time or time period over which thermal transfer can occur to or from the fluid can increase. The profiled pattern of inner surface 123 can also help to increase surface tension of the fluid flowing along inner surface 123 and can help to maintain a substantially thin and uniform film of liquid along the inner surface 123. An example of a profiled pattern for the inner surface 123 includes grooves. The grooves, in an embodiment, may be situated horizontally, vertically, in a zig-zag pattern, or any other designs. Although grooves can be provided along inner surface 123, other profiled patterns can be provided, for instances, indentations, bumps, undulations, so long as the profiling patterns can help to enhance the transport rates.

In addition to or instead of providing the inner surface 123 of body portion 12 with a profiling pattern, the inner surface 123 may include a coating to facilitate treatment, processing, and/or separation, while providing the fluid flowing along the inner surface 123 with relatively high transport rates. In an embodiment, the coating may have any chemical, physical, electrical, magnetic, or other types of properties known in the art.

It should be appreciated that although illustrated as being cylindrical in shape, body portion 12 of outer vessel 11 may be provided with any shape or configuration, for example, triangular, square, hexagonal, octagonal, or any other geometric configuration at any desired length and diameter, and depending on the application. In addition, the body portion 12 may be made from any solid material, including metal, metal alloy, plastic, glass, quartz, ceramic, or any other solid materials that can permit thermal transfer, be maintained at a certain temperature, and/or permit a change in temperature as necessary.

Still looking at FIG. 1, outer vessel 12 of reactor 10 may also include a bottom portion 13 designed to collect and remove, among other things, fluids that have been processed and that have traveled down along inner surface 123 of body portion 12. In addition, bottom portion 13 may also be designed to introduce other fluid or fluids into the outer vessel 11 for use in connection with the fluid being processed. Bottom portion 13, in one embodiment, may be integral with body portion 12. Alternatively, bottom portion 13 may be releasably secured to body portion 12 to provide a substantially fluid-tight seal therewith. To provide a substantially fluid-tight seal, body portion 12 and bottom portion 13 may be provided with complementarily engaging flanges 131, which can be secured to one another through the use of screws, nuts and bolts, or any other mechanisms known in the art. A rubber o-ring or other similar seals can also be provided between the complementarily engaging flanges 131 to enhance the fluid-tight seal. Of course, other designs may be utilized other than the use of flanges 131, so long as a substantially fluid-tight seal can be provided. In addition, to the extent desired, the bottom portion 13 may be pivotally secured to body portion 12.

To permit removal of processed fluid collected in bottom portion 13, at least one outlet 132 may be positioned at a location along the bottom portion 13, such that removal of the collected fluid can be sufficiently accomplished. In an embodiment, fluid removed from the bottom portion 13 may be collected in a catch basin (not shown) situated near outlet 132 or by any other means known in the art. Alternatively, to introduce a fluid into the outer vessel 11, inlet 133 may be provided at any location along the bottom portion 13 through which the fluid may be introduced. In certain applications, to minimize interference with other fluids that may be introduced into reactor 10 through the bottom portion 13, a divider 134 may be positioned adjacent outlet 132, so as to substantially prevent fluid flowing along inner surface 123 of body portion 122 from flowing past outlet 132 and down into the bottom portion 13 where other fluids may be present.

As illustrated, bottom portion 13 may be parabolic in shape. However, it should be appreciated that bottom portion 13 may be conical, flat, or provided with any other geometric shape which can complement the geometric profile of the bottom end 122 of body portion 12. As the bottom portion 13 can be used to accommodate one or more fluids, it may be made from any solid material similar to the material from which body portion 12 is made, including metal, metal alloy, plastic, glass, quartz, ceramic, or any other solid materials that can be maintained at a certain temperature, and/or permit a change in temperature as necessary.

Outer vessel 11 of reactor 10 may further include a top portion 14 for retaining fluids to be processed within the outer vessel 11. The top portion 14, similar to the bottom portion 13, may be integral with body portion 12. Alternatively, top portion 14 may be releasably secured to body portion 12 to provide a substantially fluid-tight seal therewith. To provide a substantially fluid-tight seal, body portion 12 and top portion 14 may be provided with complementarily engaging flanges 141, which can be secured to one another through the use of screws, nuts and bolts, or any other mechanisms known in the art. A rubber o-ring or other similar seals can also be provided between the complementarily engaging flanges 141 to enhance the fluid-tight seal. Of course, other designs may be utilized other than the use of flanges 141, so long as a substantially fluid-tight seal can be provided. In addition, to the extent desired, the top portion 14 may be pivotably secured to body portion 12.

In one embodiment, top portion 14 may be provided with at least one exhaust 142 to permit removal of any fluid, including liquid and gas, that may have been used in connection with the processing of the fluid flowing along inner surface 123 of body portion 12. Exhaust 142 may also be used to release any gas that may have been used in pressurizing the outer vessel 11 during the processing of fluid along inner surface 123. As illustrated, top portion 14 may be parabolic in shape. However, it should be appreciated that top portion 14 may be conical, flat, or provided with any other geometric shape which can complement the geometric profile of the top end 121 of body portion 12. Moreover, since the top portion 14 may need to withstand high pressure, it may be desirable to make the top portion 14 from any solid material similar to the material from which body portion 12 is made, including metal, metal alloy, plastic, glass, quartz, ceramic, or any other solid materials that can be maintained at a certain temperature, and/or permit a change in temperature as necessary.

It should be noted that although referenced as an exhaust, inlet, or outlet, these openings or apertures may be used to either introduce or remove fluid from the outer vessel 11.

Still with reference to FIG. 1, in addition to outer vessel 11, reactor 10 may further include an inner vessel 15 situated within the outer vessel and designed to provide a heat exchange surface for the fluid flowing along the inner surface 123 (i.e., treatment surface) of outer vessel 11. The inner vessel 15, in an embodiment, may be substantially cylindrical in shape and may be concentrically positioned within the outer vessel 11, such that inner vessel 15 and outer vessel 11 may be in substantial axial alignment with one another. In addition, inner vessel 15 may be provided with a measurably smaller diameter relative to that of the outer vessel 11, such that an annular space 16 may be defined between the inner vessel 15 and the outer vessel 11 to provide a pathway along which processing of the fluid along the inner surface 123 of outer vessel 11 can be implemented. In an embodiment, the size and diameter of the inner vessel 15 and the outer vessel 11 or relative ratio of one vessel to the other can vary and can be determined depending on the particular application. To support the inner vessel 15 in its position within the outer vessel 11, inner vessel 15 may be situated upon stands or legs 151. Since legs 151 may be positioned within the bottom portion 13 of outer vessel 11 where fluid flow may need to be maintained throughout, legs 151 may be porous, so as to permit fluid flow to proceed therethrough.

As illustrated, inner vessel 15 may include a body portion 17 designed to serve as a heat exchange surface within reactor 10. In particular, the inner vessel body portion 17 may include an outer surface 171, and an inner surface 172 along which a heat exchange fluid may flow in the direction of arrows 173. In one embodiment, the heat exchange fluid flowing along the inner surface 172 of inner vessel 15 may be provided at a different temperature relative the fluid being processed flowing along inner surface 123 of the outer vessel 12. By providing the heat exchange fluid with a different temperature, a temperature differential can be created across an annular space 16 between the inner surface 123 of outer vessel 11 and outer surface 171 of inner vessel 15 to facilitate relatively high transport rates during treatment, processing and/or separation of the fluid flowing along the inner surface 123 of outer vessel 12. Examples of a heat exchange fluid include water, oil, glycol mix, Dow Therm™, or any fluid capable of carrying out heat exchange.

The inner surface 172 of inner vessel 15, similar to the inner surface 123 of the outer vessel, in one embodiment, may be designed so that the heat exchange fluid may be permitted to flow down along the length of the inner surface 172 in a substantially uniform thin film. The substantially uniform flow of the heat exchange fluid along inner surface 172, in an embodiment, may be facilitated, for instance, by gravitational force. In accordance with one embodiment of the present invention, the thin film flow provided on the inner surface 172 of the inner vessel 15 may have a thickness ranging from approximately 1.0 micron to approximately 1.0 cm. However, it should be noted that a thickness less than the range provided or more than the range provided is also contemplated, depending on the particular application, as the inner vessel 15 of the present invention is not intended to be limited in this manner.

To help increase relative surface tension in order to maintain a substantially thin and uniform film of fluid along the inner surface 172 of inner vessel 15, inner surface 172 may be provided with a profiled pattern (not shown), similar to that provided along the inner surface 123 of outer vessel 11. Examples of a profiled pattern for inner surface 172 of inner vessel 15 includes grooves. The grooves, in an embodiment, may be situated horizontally, vertically, in a zig-zag pattern, or any other designs. Although grooves can be provided along inner surface 172, other profiled patterns can be provided, for instances, indentations, bumps, undulations, so long as the profiled patterns can help to enhance the uniformity of the thin film flow.

It should be appreciated that although illustrated as being cylindrical in shape, body portion 17 of inner vessel 15 may be provided with any shape or configuration, for example, triangular, square, hexagonal, octagonal, or any other geometric configuration at any desired length and diameter, and depending on the application. In addition, the body portion 17 may be made from any solid material, including metal, metal alloy, plastic, glass, quartz, ceramic, or any other solid materials that can permit thermal transfer, be maintained at a certain temperature, and/or permit a change in temperature as necessary, in order to generate a temperature differential across between the inner surface 123 of outer vessel 11 and outer surface 171 of inner vessel 15.

Inner vessel 15 of the reactor 10 may also include a bottom end 18 for collecting and removing the heat exchange fluid that may have traveled down the inner surface 172 of body portion 17. The bottom end 18, in one embodiment, may be integral with the body portion 17 so as to provide a substantially fluid-tight seal with the body portion 17. To permit removal of collected fluid from the bottom end 18, exit port 181 may be provided. In an embodiment, exit port 181 may be in fluid communication with the bottom portion 13 of outer vessel 11, so that the heat exchange fluid can exit the inner vessel 15 into the bottom portion 13 of outer vessel 11, where it can subsequently be removed through outlet 182. As shown, the bottom end 18 may be conical in shape. However, it should be appreciated that bottom end 18 may be parabolic, flat, or provided with any other geometric shape, so long as it can direct the heat exchange fluid to exit port 181.

Inner vessel 15 of reactor 10 may further include a top end 19 for retaining the heat exchange fluid within the inner vessel 15. The top end 19, in an embodiment, may be integral with the body portion 17 so as to provide a substantially fluid-tight seal with the body portion 17. Similar to the bottom end 18, the top end 19 of the inner vessel 15 may be conical in shape. However, it should be appreciated that top end 19 may be parabolic, flat, or provided with any other geometric shape, so long as it can act to retain the heat exchange fluid within the inner vessel 15.

In one embodiment of the present invention, the top end 19 and bottom end 18 of the inner vessel 15 may be made from any solid material similar to that provided for the body portion 17 of the inner vessel. Examples of such a material include metal, metal alloy, plastic, glass, quartz, ceramic, or any other solid materials that can permit thermal transfer, be maintained at a certain temperature, and/or permit a change in temperature as necessary.

As noted above, annular space 16 may be situated between the inner surface 123 of the outer vessel 11 and outer surface 171 of the inner vessel 15, so as to maintain a temperature differential therebetween to facilitate treatment, processing, and/or separation, while providing the fluid flowing along the inner surface 123 with relatively high transport rates. In one embodiment of the invention, since annular space 16 provides a pathway along which processing of the fluid along the inner surface 123 of outer vessel 11 can be implemented, annular space 16 may be provided with a design to permit at least a second fluid (i.e., gas or liquid) to enter into annular space 16 for contacting and acting on the descending fluid being processed. The second fluid, in one embodiment, may be permitted to move upward (i.e., ascending flow) within annular space 16 and along the direction of arrows 161 in a counter-current manner relative to the descending flow of the fluid being processed along the direction of arrows 125. By creating a counter-current flow between the ascending second fluid and the descending fluid being processed, points of contact at an interface between the second fluid and fluid being processed can increase over a relatively larger surface area to impart relatively high transport rates.

In addition, the residence time or period of time over which contact can occur between the descending fluid and ascending fluid within the annular space 16 can be substantially enhanced by providing one or both of the inner surface 123 of the outer vessel 11 and the outer surface 171 of the inner vessel 15 with a profiled pattern. A profiled pattern, such as pattern 174 shown on the outer surface 171 of inner vessel 15, may be utilized. Alternatively, other profiled patterns, such as grooves, indentations, bumps, undulations may be used. Each of these patterns, in addition, may be situated horizontally, vertically, in a zig-zag pattern, or any other designs as noted above. For illustrative purposes, profiled pattern 174, as shown, can be implemented on each of the inner surface 123 of outer vessel 11 and inner surface 172 of inner vessel 15. By enhancing the residence time of the process within the annular space 16, the process, in an embodiment, can be imparted with relatively higher energy and processing efficiency than otherwise.

Annular space 16, in accordance with one embodiment of the present invention, may be provided with a width ranging from about 0.2 cm to about 2 cm. However, it should be understood that an annular space with any size width can be used. Due to the relatively short distance across the annular space 16, the temperature differential or gradient that may be generated within the annular space 16 can also lead to relatively higher energy and processing efficiency. Moreover, because of the design of the reactor 10, annular space 16 may be maintained under vacuum condition in connection with certain applications for effecting reaction kinetics. It should be appreciated that because a second fluid may be directed into annular space 16, the size and design of divider 134, situated adjacent outlet 132, may permit divider 134 to extend into the annular space 16, while not coming into contact with inner vessel 15. In that way, the presence of divider 134 avoids compromising the entry of the second fluid into annular space 16, while maintaining a sufficient length to direct fluid from the inner surface 123 of outer vessel 11 through outlet 132.

To further impart and enhance the transport rates of the fluid being processed along inner surface 123 of outer vessel 11, an energy source, such as heat pump jacket 111, may be provided circumferentially about body portion 12 of outer vessel 11 to act as a source for heating or cooling the fluid flowing along the inner surface 123. For instance, if the interaction between the descending fluid being processed and the ascending second fluid within the annular space 16 results in a measurable change in temperature of the descending fluid, jacket 111 may be used to adjust the temperature of the descending fluid up or down, as appropriate, until the desired temperature is achieved.

Jacket 111, in one embodiment, may be any commercially available heat pump, and may include inductive, resistive, or conductive elements. The jacket 132 may further include additional components to improve the thermal performance. Alternatively, instead of a heat pump, jacket 111 may be designed to allow a fluid at a relatively raised temperature or at a relatively cool temperature to run therethrough, in order to act as a source for heating or cooling the fluid flowing along the inner surface 123 of outer vessel 11. To that end, jacket 111 may include ports 112 to permit gases, liquids, solids, or fluids to enter or exit jacket 111. In an embodiment, jacket 111 may be made from metal, metal alloy, plastic, glass, quartz, ceramic, or any other materials that can maintain and impart heat or cold temperatures.

One of the advantages of the reactor 10 of the present invention is the ability to provide a substantially uniform thin film along the inner surface 123 of outer vessel 11 for processing. To do so, reactor 10 utilizes, in accordance with one embodiment, a fluid dispensing system 101, as illustrated in FIG. 1. Dispensing system 101, in an embodiment, may include a pathway 102, designed to introduce the fluid being processed from a source (not shown) into the interior of outer vessel 11. Dispensing system 101 may also include a first rotatable member 103, such as a disc, in fluid communication with pathway 102, so that fluid from pathway 102, if desired, can be continuously be directed to and subsequently be dispensed by first rotatable member 103 on to the inner surface 123 of the outer vessel 11.

It should be appreciated that member 103, in an embodiment, can be designed in such a manner that its rotation imparts a centrifugal action, so as to cause fluid received from pathway 102 to be directed outward toward a periphery (i.e., edge) of member 103. The rotation of member 103 can further cause the fluid at the periphery of member 103 to be continuously spun off the member 103 into substantially fine droplets or fiber-like elements and on to the inner surface 123 of outer vessel 11. The continuous provision of substantially fine droplets or fiber-like elements on to the inner surface 123 allows a substantially uniform thin film to be formed as the fluid being processed descends along the inner surface 123.

In the embodiment shown in FIG. 1, member 103 can be positioned atop an elongated tube 104, within the outer vessel 11, and in spaced relation to pathway 102. Elongated tube 104, as illustrated may extend through the bottom portion 13 of outer vessel 11, into the inner vessel 15, and out through the top end 19 of the inner vessel 15, so that it is in substantial axial alignment with pathway 102. In an embodiment, tube 104 may be concentrically positioned within outlet 182, which outlet fluid from the inner vessel 15 may exit.

Dispensing system 101 may also include a second rotatable member 105 in fluid communication with tube 104, and situated within the inner vessel 15. Second rotatable member 105, in an embodiment, may be used to dispense a substantially uniform thin film of a heat exchange fluid on to the inner surface 172 of inner vessel 15. As shown, the second member 105 may be perforated so that fluid directed along tube 104 can be dispensed from the second member 105.

Similar to first rotatable member 103, the second rotatable member 105 can be also designed in such a manner that its rotation imparts a centrifugal action, so as to cause fluid received from tube 104 to be directed outward toward a periphery (i.e., edge) of member 105. The rotation of second member 105 can further cause the fluid at its periphery to be continuously dispensed through its perforations as substantially fine droplets or fiber-like elements and on to the inner surface 172 of inner vessel 15. The continuous provision of substantially fine droplets or fiber-like elements on to the inner surface 172 allows a substantially uniform thin film to be formed as the fluid being processed descends along the inner surface 172.

Dispensing system 101 may further include a motor (not shown) designed to actuate rotation of tube 104, for instance, in the direction shown by arrow 106, and thus rotation of members 103 and 105. The motor, in an embodiment, may be coupled to an end of tube 104 opposite that to which member 103 is positioned and may be designed to rotate at a sufficient rate. In one embodiment, the rate of rotation of the motor may be controlled so that the rate of rotation can be varied, as desired. For example, the rate can be varied in order to ensure uniform distribution of thin film when the flow rate of the fluid may have changed.

Figure 2:
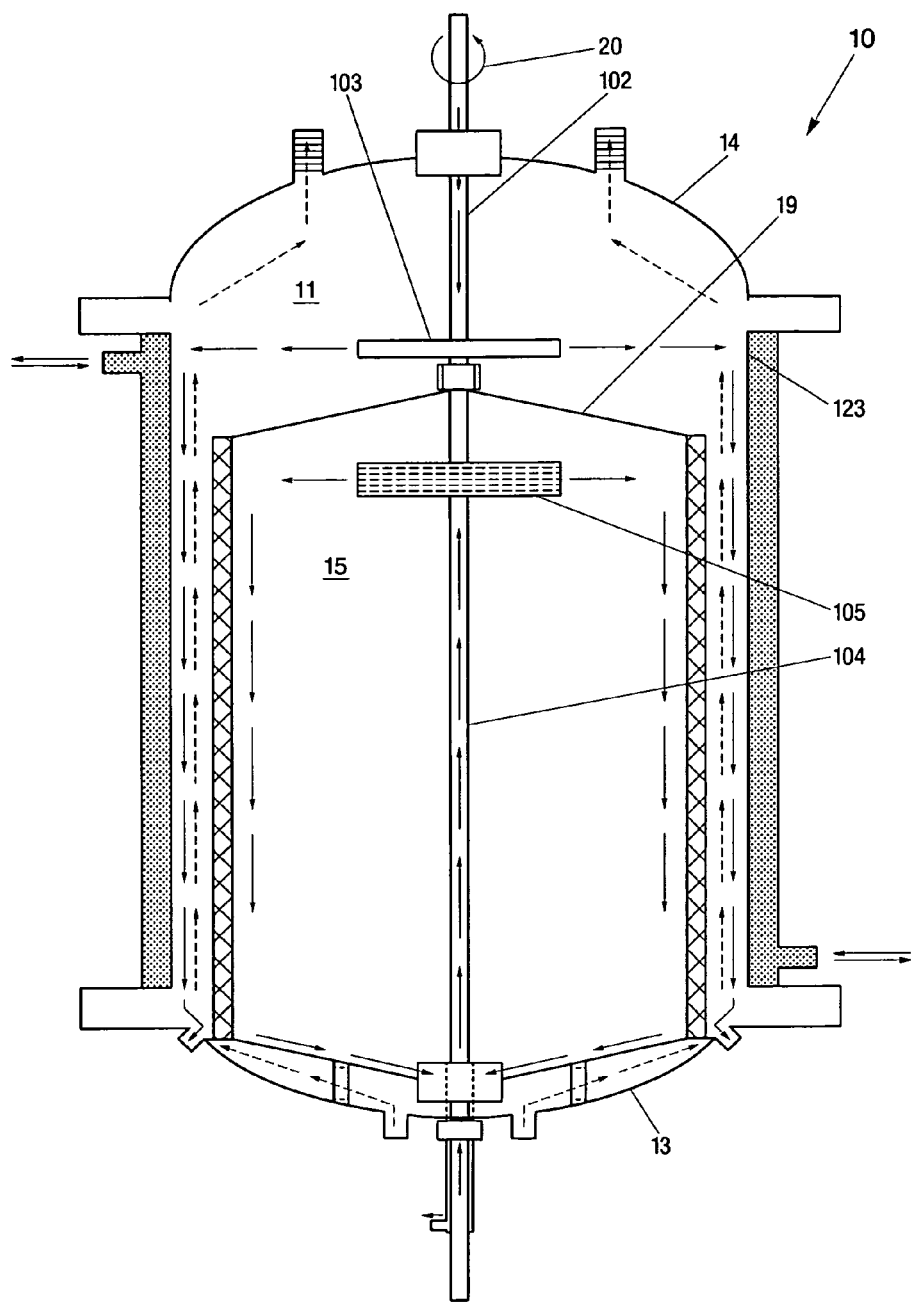
FIG. 2 illustrates a longitudinal sectional view of another continuous reactor for providing fluid-fluid or solid-fluid-fluid reactions in accordance with one embodiment of the present invention.

Although illustrated as being in spaced relation to pathway 102, the position of first rotatable member 103 within dispensing system 101, as shown in FIG. 2, may be designed so that the rotatable member 103 may be in substantial contact and in fluid communication with pathway 102. In the embodiment shown in FIG. 2, pathway 102 may be an extension of tube 104 and may remain in substantial axial alignment with tube 104. In other words, tube 104 may be lengthened, so that it may continue to extend from the top end 19 of inner vessel 15 and out through the top portion 14 of the outer vessel 11. First rotatable member 103, on the other hand, may include openings (not shown) about its periphery, so that fluid directed into rotatable member 103 may be dispensed from within member 103, through the openings, and on to the inner surface 123 of outer vessel 11. A motor (not shown) may be coupled to an end of tube 104 extending from the top portion 14 of outer vessel 11, and may actuate rotation of tube 104 in the direction of arrow 20. Of course, to the extent desired, the motor may alternatively be coupled to the opposite end of tube 104 adjacent bottom portion 13 of outer vessel 11.

Figure 3:
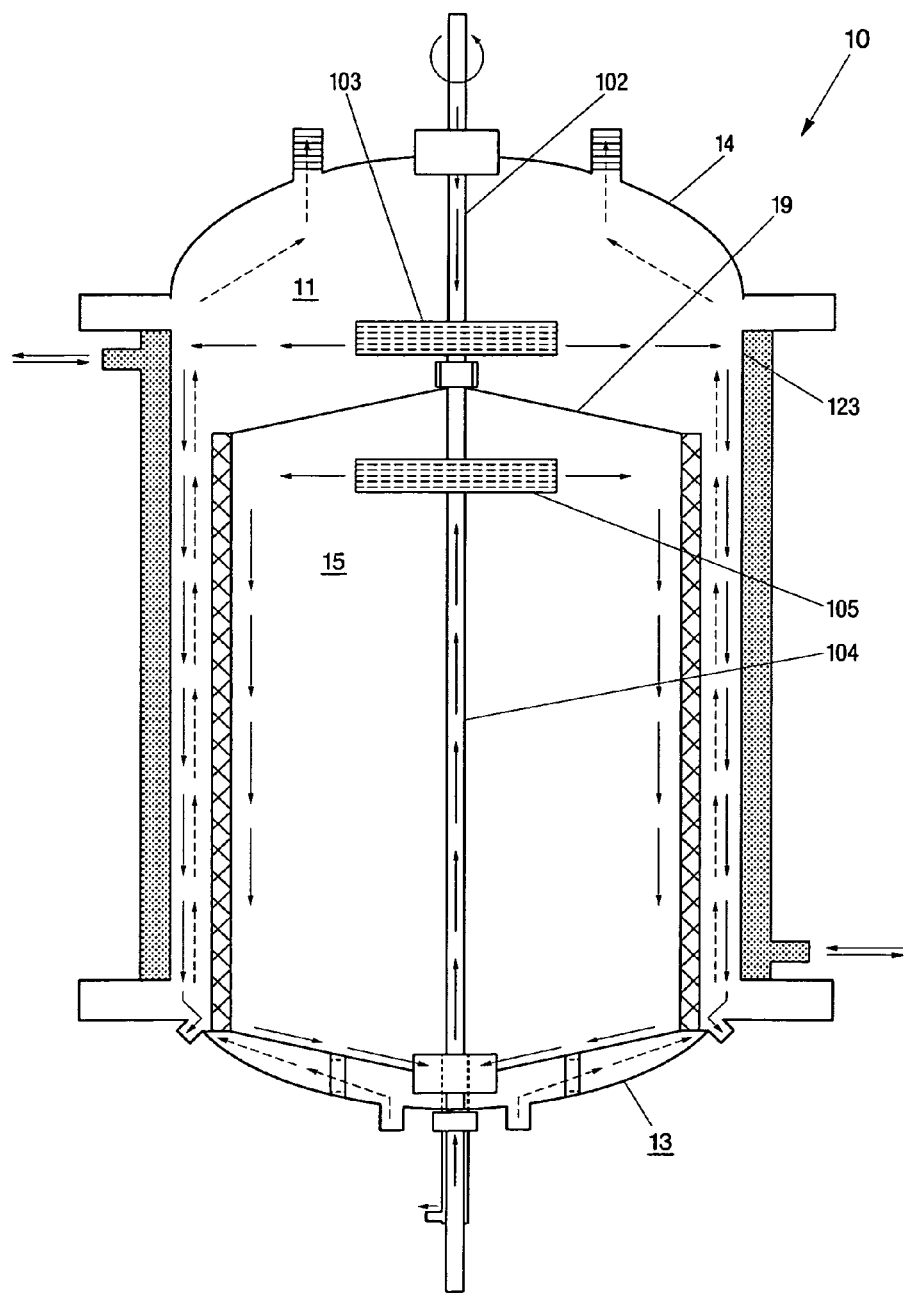
FIG. 3 illustrates a longitudinal sectional view of still another continuous reactor for providing fluid-fluid or solid-fluid-fluid reactions in accordance with one embodiment of the present invention.

The first rotatable member 103, as illustrated in FIG. 2, may be a hollow disc, a hollow tube, or any other designs, so long as it is rotatable and capable of being provided with openings about its periphery for dispensing purposes. However, it should be appreciated that, as shown in FIG. 3, rotatable member 103 may also be provided with a design similar to the second rotatable member 105. Specifically rotatable member 103 may be provided with a plurality of perforations may, so that fluid directed along pathway 102 of tube 104 can be into rotatable member 103 and dispensed therefrom.

Figure 4:
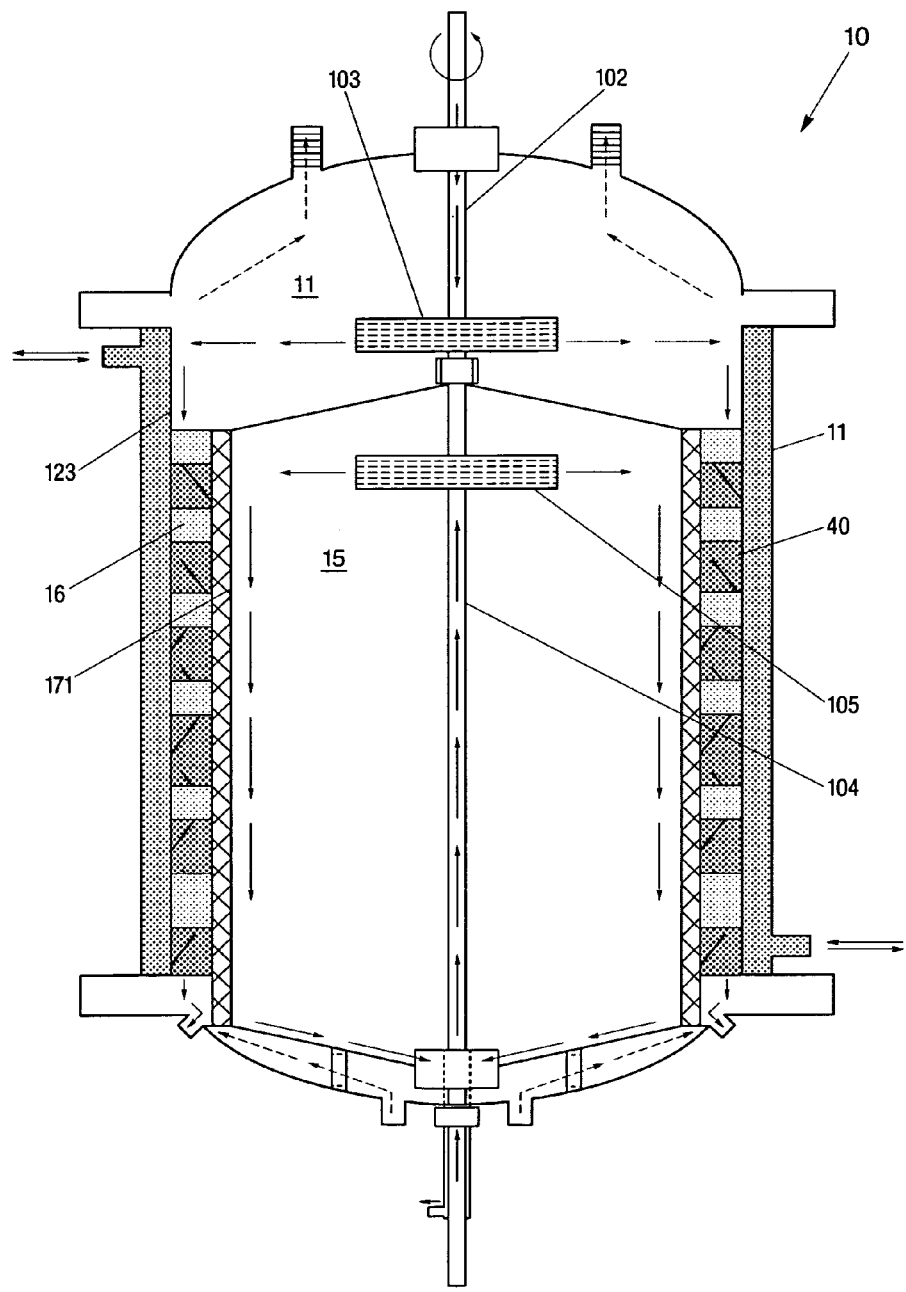
FIG. 4 illustrates a longitudinal sectional view of another continuous reactor for providing fluid-fluid or solid-fluid-fluid reactions in accordance with one embodiment of the present invention.

Looking now at FIG. 4, for certain applications where, instead of accommodating a thin film of fluid, annular space 16 of reactor 10 may be filled with a volume of the fluid being processed. In such an embodiment, the continuous reactor 10 of the present application may be provided with a bed of packing material 40 within the annular space 16. The bed of packing material 40 may be used to increase surface area over which the volume of fluid being processed can contact to enhance transport rates. In an embodiment, the packing material 40 may include mesh-like materials, beads, monolith, or any other material that can provide a substantially tortuous pathway through which the fluid being processed needs to travel, so as to increase the residence time or time period over which the fluid can be processed. In such an embodiment, the reaction may involve a counter-current gas being introduced into the annular space 16 in the presence of the fluid being processed. By its introduction, the counter-current gas can generate bubbles in the volume of fluid and that can be directed up through the bed of packing material 40. In addition, the presence of the tortuous path within the bed of packing material 40 as well as the packing material 40 can act to splice or divide up each bubble into multiple smaller ones. In this way, an increase in surface area can be generated over the many more bubbles for reaction with the fluid being processed. In an embodiment, as smaller bubbles are being generated, the bed of packing material 40 can act to substantially uniformly distribute the bubbles within the volume of fluid in annular space 16.

To the extent desired, the packing material 40 may be coated with a layer of a catalyst to facilitate treatment, processing, and/or separation, while further enhancing the fluid flowing through the annular space 16 with relatively high transport rates. In one embodiment, the packing material 40 may be heated or cooled, for instance, by jacket 11 via the inner surface 123 of outer vessel 11 and/or by the heat exchange fluid via the outer surface 171 of inner vessel 15, depending on the particular application. Moreover, upon heating or cooling, the presence of the packing material within the annular space 16 can provide a substantially uniform distribution of temperature across the annular space 16.

Operation

In operation, looking again at FIG. 1, a fluid being processed may, in general, be substantially continuously introduced into outer vessel 11 of reactor 10 through pathway 102. The fluid being processed may next be directed onto or into the first rotatable member 103 where, as a result of centrifugal force due to rotation of the member 103, it may be directed outward toward the periphery (i.e., edge) of member 103. The rotation of member 103 further causes the fluid at the periphery to be continuously dispensed from the member 103 as substantially fine droplets or fiber-like elements and on to the inner surface 123 of outer vessel 11. The continuous provision of substantially fine droplets or fiber-like elements on to the inner surface 123 allows a substantially uniform thin film to be formed as the fluid being processed descend along the inner surface 123.

At around the time the fluid being processed is introduced through pathway 102, a heat exchange fluid, at a temperature different from that of the fluid being processed, may be substantially continuously introduced the inner vessel 15 through tube 104. This heat exchange fluid may subsequently be directed into the second rotatable member 105, where, again as a result of the centrifugal force imparted by the rotating member 105, the heat exchange fluid gets directed toward the periphery of member 105. Thereafter, as with the first rotatable member 103, the heat exchange fluid may be continuously dispensed as substantially fine droplets or fiber-like elements and on to the inner surface 172 of inner vessel 15 to allow a substantially uniform thin film to flow along the inner surface 172.

In certain applications, for instance, in a gas-liquid reaction, a counter-current fluid (i.e., a gas) may be introduced into the annular space 16 by way of inlet 133 on bottom portion 13 of outer vessel 11. Such fluid can be directed up into the annular space 16 along the outer surface 171 of inner vessel 15 and allow to interact with the descending fluid (i.e., liquid) to be processed moving along the inner surface 123 of outer vessel 11. The presence of the counter-current fluid along the annular space 16 can increase the efficiency of the reaction, treatment, processing or separation of the descending fluid. Such an increase in efficiency can be the result of an increase in the point of contact with the descending fluid and/or an increase in the surface area at the boundary between the descending fluid and the ascending counter-current fluid. In such applications the resulting reaction based on the continuous interaction between the descending fluid and ascending counter-current fluid may affect or influence the temperature of each fluid (e.g., an exothermic reaction). To that end, the temperature of the counter-current fluid along the outer surface 171 of inner vessel 15 can be controlled by the heat exchange fluid moving along the inner surface 172 of inner vessel 15, while the temperature of the descending fluid being processed can be controlled by jacket 111, if necessary.

Once the descending processed fluid reaches the bottom portion 13 as it flows along the inner surface 123 of outer vessel 11, it may be directed into outlet 132 and removed from reactor 10. Similarly, the descending heat exchange fluid, once it has reached the bottom end 18 of inner vessel 15, it may be directed through exit port 181 and removed from reactor 10 through outlet 182.

As a result of the design of the reactor 10 of the present invention, along with the ability of reactor 10 to provide a substantially uniform thin film flow of the fluid being processed, an increase in the surface area as well as the residence time or time for interaction between the fluid being processed and a counter-current fluid, and the ability to impart a difference in temperature between the thin film fluid being processed and the heat exchange fluid to create a thermal gradient across the narrow annular space 16, the reactor 10 of the present invention can enhance treatment, processing and/or separation of the fluid being processed, while imparting such fluid with relatively high transport rates, such as thermal transfer, mass transfer and/or mixing rates. In addition, because of the ability to continuously provide a substantially uniform thin film of fluid over a substantially large surface area, reactor 10 of the present invention can provide substantially high throughput processing of the fluid or fluids involved.

Example 1

Fluid-Fluid or Solid-Fluid-Fluid Reactions

As shown in the embodiments depicted in FIGS. 1, 2, 3 and 5 the reactor 10 of the present may be applicable for fluid-fluid or solid-fluid-fluid reactions in connection with organic systems. It should be appreciated that the term fluid as used herein and throughout this application includes, gas and liquid. Thus, reactor 10 may be applicable, for example, for gas-liquid, liquid-liquid, solid-gas-liquid reactions, or any other combination.

The reactor 10 illustrated in FIGS. 1, 2, and 3, in one embodiment, has particular application for organic systems where higher pressures and temperatures are used, for instance, hydrogenation, oxidation, polymerization, dealkylation, alkylation, methylation, carboxylation, decarboxylation, and Fisher-Tropps, among others. This application may further be useful in, for instance, the production of organic products from coal slurry or the production of dimethyl ether (DME) using either natural gas, methanol, or other organic liquids or a mixture of gases as feed stock. It may further be applicable in the production of biodiesel and feedstock with low free fatty acid for diesel using transesterification and esterification processes.

In FIGS. 1-3, in a liquid-gas reaction, a liquid to be processed may initially be continuously introduced though pathway 102 and onto to the first rotatable member 103. The liquid may include water, solvent, chemicals, disinfectant, oil, salt water, methanol, ethanol, liquid catalyst, slurry type catalyst, or any other type of fluid. Once on the rotatable member 103, the centrifugal force from the rotating member 103 act to continuously disperse the liquid as substantially fine droplets or fiber-like elements onto the inner surface 123 of the outer vessel 11, in such a way so as to create a continuous substantially uniform thin film of fluid on the inner surface 123. At around the time the liquid to be processed is introduced through pathway 102, a counter-current gas may be introduced into the annular space 16 by way of inlet 133 on outer vessel 11. This gas can be directed up into the annular space 16 along the outer surface 171 of inner vessel 15 and allow to interact with the descending liquid moving along the inner surface 123 of outer vessel 11. Examples of such a gas can include hydrogen, oxygen, air, synthesis gas, $CO_2$, nitrogen, or any other reactive or non-reactive gases.

In this liquid-gas reaction, in certain instances, an exothermic reaction may result. To that end, the temperature of the descending liquid, can be controlled by jacket 111 to maintain the descending liquid at a desired temperature. As for the ascending counter-current gas, to control its temperature, a heat exchange fluid, at a temperature different from that of the descending liquid, may be substantially continuously introduced the inner vessel 15 through tube 104. This heat exchange fluid may subsequently be directed into the second rotatable member 105, where, as a result of the centrifugal force imparted by the rotating member 105, gets continuously dispersed as substantially fine droplets or fiber-like elements on to the inner surface 172 of inner vessel 15 to create a continuous substantially uniform thin film along the inner surface 172.

Once the descending processed liquid reaches the bottom portion 13 as it flows along the inner surface 123 of outer vessel 11, it may be directed into outlet 132 and removed from reactor 10. Similarly, the descending heat exchange fluid, once it has reached the bottom end 18 of inner vessel 15, it may be directed through exit port 181 and removed from reactor 10 through outlet 182. As for the ascending counter-current gas, it may be removed through exhaust 142. To the extent desired, a condenser may be provided to condense the removed counter-current gas for efficient collection. Moreover, if appropriate, the reaction along the annular space 16 may be maintained under vacuum for effecting reaction kinetics.

In another embodiment, reactor 10, as illustrated in FIG. 4, may be used in a solid-fluid-fluid reaction and may include a bed of packing material 40 within the annular space 16. The bed of packing material 40 may be used to increase surface area over which a descending volume of liquid being processed can come into contact to further enhance transport rates. In addition, the packing material 40 may provide a substantially tortuous pathway through which the descending liquid needs to travel and/or increase the time period over which descending liquid can be processed. To that end, the packing material 40 may act to further facilitate treatment, processing, and/or separation, while further imparting the descending liquid with relatively high transport rates. The packing material 40 may also be heated or cooled, for instance, by jacket 11 and/or by the heat exchange fluid within the inner vessel 15, depending on the particular application. Upon heating or cooling, the presence of the packing material within the annular space 16 can provide a substantially uniform distribution of temperature across the annular space 16.

Example 2

Evaporation and Distillation

Figure 5:
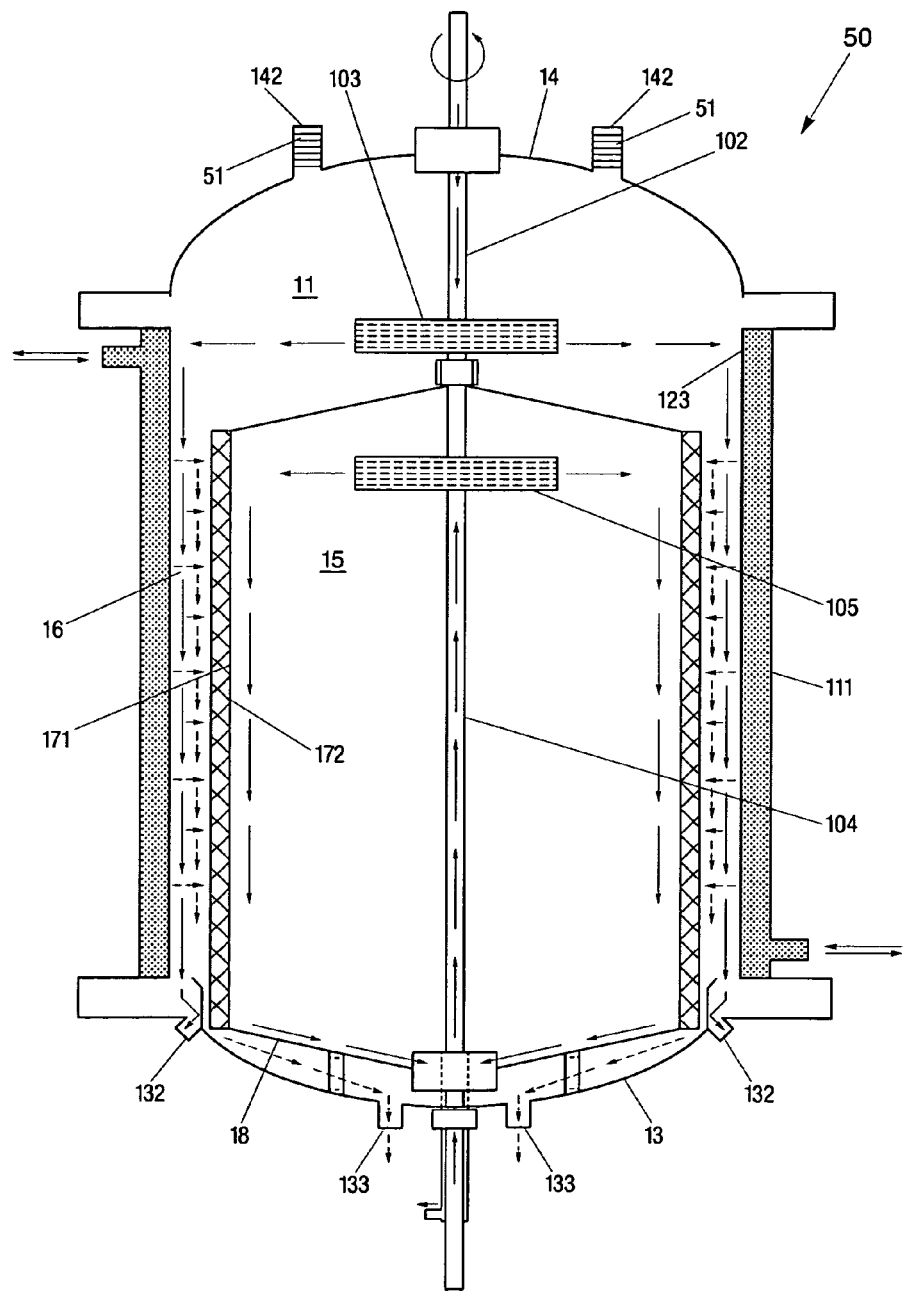
FIG. 5 illustrates a longitudinal sectional view of a continuous reaction for implementing evaporation and/or distillation processes in accordance with one embodiment of the present invention.

As shown in the embodiment depicted in FIG. 5, reactor 50 of the present invention may be used in evaporation and distillation processes. Evaporation and distillation processes include, for instance, removing water from oil, ethanol, methanol, glycerine, or other compounds. In addition, such processes may include removing light organics from heavy organics, such as light sweet crude from heavy oil, methanol from biodiesel and glycerine mix, methanol from glycerine, and light organics from heavy oil. Furthermore, such processes may include removing organic solvents such as ethyl acetate from polymer dispersion or removing organic solvents or monomers during depolymerization processes. It may also be used in desalination of water, concentration of fruit juice, concentration of food materials, such as soup, milk, removal of light organics from ground water, removal of dissolved organics from processed water (i.e., industrial waste water), and removal of dissolved gases from a liquid, such as carbon dioxide from hot amine solutions, hydrogen sulfide from water, slurry concentration, as well as a range of other applications.

In an application for removing light organics from heavy organics, the inner surface 123 of outer vessel 11 may be heated, for instance, by jacket 111, while the outer surface 171 of inner vessel 15 may be cooled by a substantially cooled fluid flowing along the inner surface 172 of inner vessel 15. In addition, the annular space 16 between outer vessel 11 and inner vessel 15 may be maintained under vacuum for effecting reaction kinetics.

Under the conditions provided above, in one embodiment, liquid containing light organics or material to be evaporated or distilled, may be introduced through pathway 102 and distributed by the first rotatable member 103 on to and uniformly along the heated inner surface 123 of outer vessel 11. As a thin film of the liquid descends down the heated inner surface 123, vapors may be generated along the inner surface 123 and thereafter may come into contact with the relatively cooler outer surface 171 of the inner vessel 15. Upon contact with the relatively cooler outer surface 171, the vapors may condense and change phase into liquid. This condensed liquid may then flow downwards along the outer surface 171 of the inner vessel 15, where it can be collected in the bottom portion 13 of the outer vessel 11. This phase change from vapor to liquid form may take place over a substantially short distance within the annular space 16, typically the distance between the inner surface 123 of outer vessel 11 and outer surface 171 of inner vessel 15. One benefit of this configuration is that it provides an energy efficient method for separating lighter components from heavier ones.

To further enhance energy efficiency or conservation of energy involved with this particular process, the liquid to be processed can also be used as a heat exchange fluid. In particular, relatively cool liquid to be processed can be directed into inner vessel 15 via tube 104 and along inner surface 172. As it descends along inner surface 172, vapors generated from the descending fluid being processed along inner surface 123 of the outer vessel 11 can come into contact with outer surface 171 of inner vessel 15. Thermal energy from the vapors may thereafter be absorbed by the relatively cool liquid to be processed descending along the inner surface 172 of inner vessel 15. This liquid along the inner surface 172, now with a raised temperature, can be collected at the bottom end 18 of inner vessel 15 and directed onto the inner surface 123 of the outer vessel 11 through pathway 102 and first rotating member 103. As it descends along the inner surface 123, its vapors again come into contact with the relatively cooler outer surface 171 of inner vessel 15 to heat up the fluid along the inner surface 172 of inner vessel 15. Once this cycle has been established, jacket 111 can be turned off to conserve energy and the process described herein can proceed in an energy efficient manner.

For any un-condensed vapors that may have traveled towards the top portion 14 of outer vessel 11, a condenser may be provided to condense such remaining vapors. In an embodiment, the condenser may be located outside the outer vessel 11 and in fluid communication with exhaust 142 to received un-condensed vapors directed through exhaust 142. Alternatively, the condenser may be located within the outer vessel 104. In one embodiment, the condenser may be in the form of coils 51 positioned within the exhaust 142.

It should also be noted that not all of the liquid distributed on to the heated inner surface 123 of outer vessel 11 may have vaporized. To that end, such liquid may be permitted to flow down the inner surface 123 and directed out through outlet 132 at the bottom portion 13 of outer vessel 11. If desired, such liquid may be recycled back through pathway 102 for re-processing.

Alternatively, catch basins may be positioned underneath the reactor 50 to collect liquid removed from outlet 132 of bottom portion 13. For condensed liquid that has traveled down the outer surface 171 and that has accumulated in the bottom portion 13, separate catch basins may be provided to collect such fluid through inlet 133.

Example 3

Deheating of Superheated Steam

Figure 6:
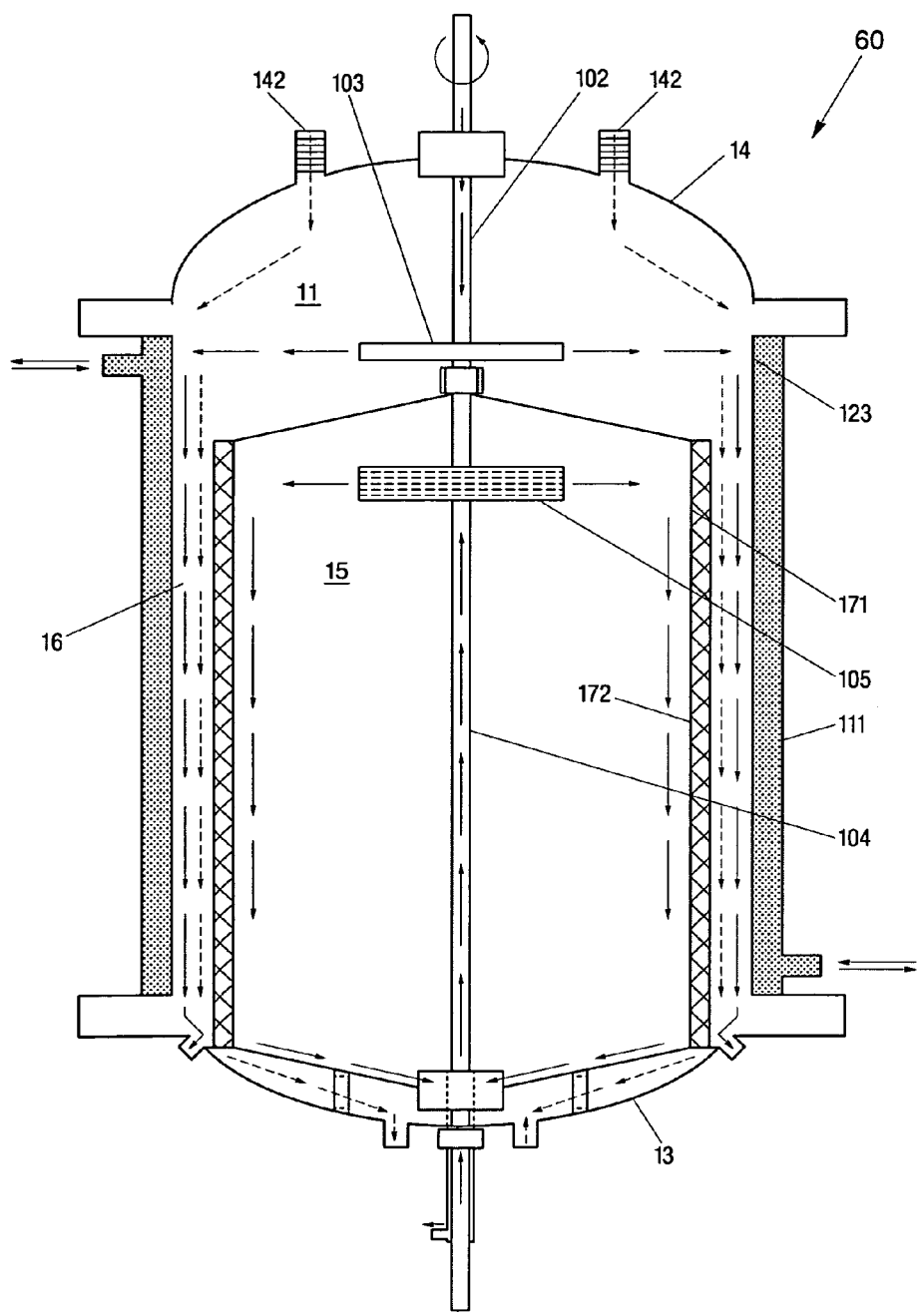
FIG. 6 illustrates a longitudinal sectional view of a continuous reactor for cooling of superheated steam in accordance with one embodiment of the present invention.

In the embodiment depicted in FIG. 6, reactor 60 of the present invention may be used in connection with cooling of superheated steam, or desuperheating of steam. Both the inner surface 123 of outer vessel 11 and outer surface 171 of inner vessel 15 may be maintained at a temperature measurably lower (i.e., cooler) relative to the superheated steam.

To maintain the inner surface 123 of outer vessel 11 at a relatively cool temperature, a relatively cool liquid may be introduced through pathway 102 distributed by the first rotatable member 103 on to and substantially uniformly along the inner surface 123 of outer vessel 11. In addition or alternatively, jacket 111 may be set at a predetermined temperature level to keep the inner surface 123 at such a relatively cool temperature. To maintain the outer surface 171 of the inner vessel 15 at a similar relatively cool temperature, a relatively cool liquid may be introduced through tube 104 into inner vessel 15. This fluid may subsequently be directed into the second rotatable member 105 and subsequently distributed on to and substantially uniformly along the inner surface 172 of inner vessel 15.

Under the condition provided above, superheated steam may be injected into outer vessel 11 through exhaust 142 in the top portion 14 of outer vessel 11. In an embodiment, the superheated steam may be provided as a precipitation of water particles ranging from, for example, microscale to nanoscale. The steam may then be directed into the annular space 16 where it encounters, on one side, a relatively cool inner surface 123 of outer vessel 11, and on the other side a relatively cool outer surface 171 of inner vessel 15. In addition, as the superheated steam enters the relatively cool annular space 16, it gets bombarded with cool fluid being dispensed from first rotating member 103. The encounter with the relatively cool fluid being dispensed from rotating member 103 acts to cool the superheated steam down to a certain level. Then as the steam moves along the annular space 16, it may further be cooled and condenses into liquid for collection.

In particular, as the superheated steam travels into the annular space 16 and through the relatively cool liquid being dispensed, in one embodiment, the steam may transfer some of its thermal energy (i.e., heat) to the dispensed liquid, and may get pushed by the dispensed liquid onto the inner surface 123 of the outer vessel 104. In an embodiment, the dispensed liquid may act to coat the particles of steam, i.e., an in-situ coating process, and pushes the steam on to the inner surface 123. As the steam is pushed on to the inner surface 123 of the outer vessel 11, it may be cooled down again by relatively cool the temperature that is being maintained along inner surface 123. In addition, as the steam transfer its heat to the dispensed liquid whether in the annular space or along the inner surface 123, the increase in temperature may cause the liquid to vaporize. The vapor, when generated within the annular space 16, may be condensed by the relatively cool outer surface 171 of the inner vessel 15. This continual interaction with the dispensed fluid, inner surface 123 of the outer vessel 11, and outer surface 171 of inner vessel 15, can act to quickly cool the superheated steam. The cooled steam may then condense and flow along the outer surface 171 of inner vessel 15 and inner surface 123 of outer vessel 11 down toward bottom portion 13 of outer vessel 11 where it may be collected.

It should be appreciated that although cooling of superheated steam may be carried out with concurrent flow as described above, it may also be carried out in a counter-current flow design. That is, steam can be introduced in a counter-current direction to the relatively cool fluid being dispensed from first rotatable member 103.

Example 4

UV or Microwave-Initiated Reactions

Figure 7:
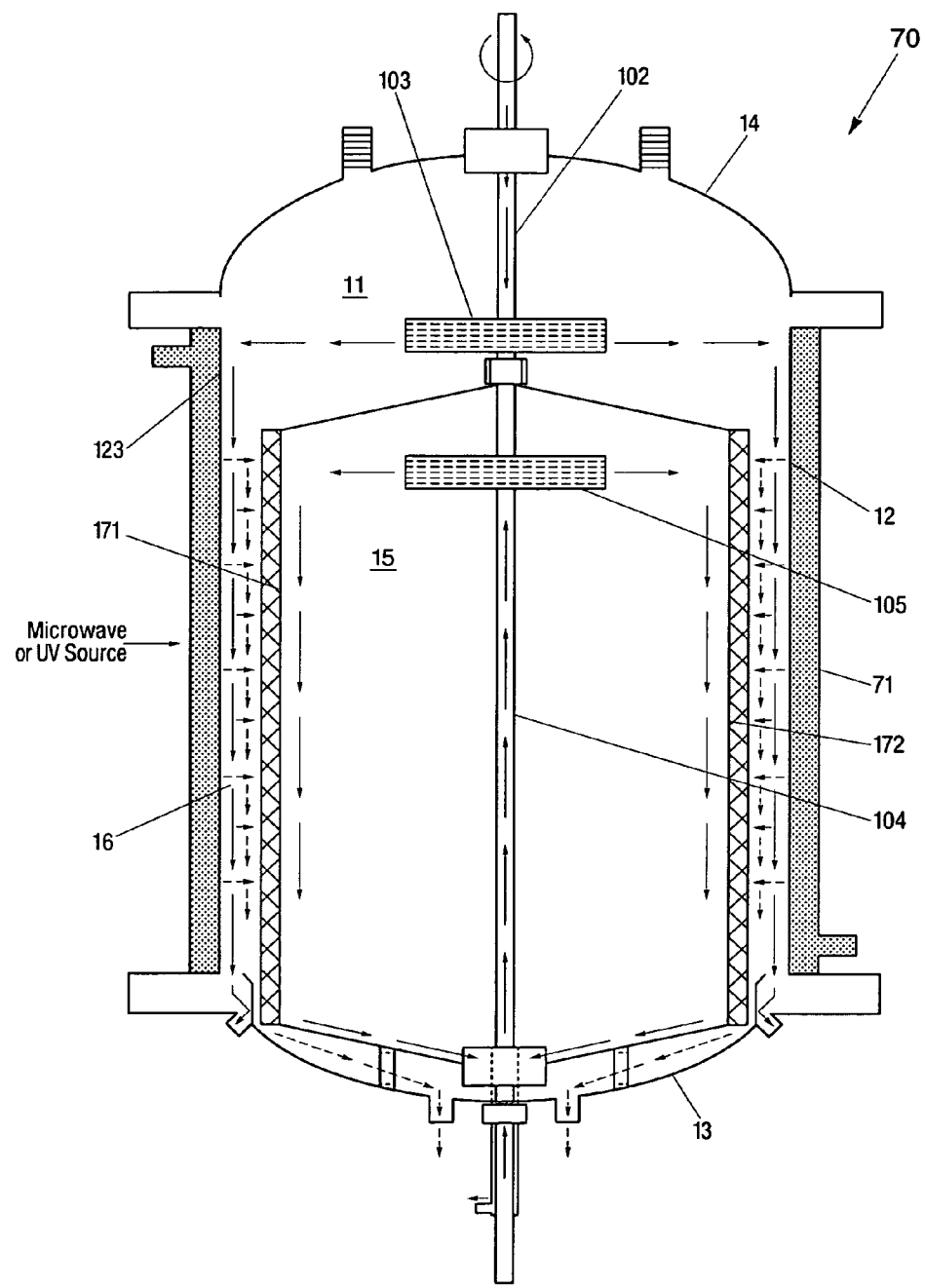
FIG. 7 illustrates a longitudinal sectional view of a continuous reactor for implementing UV and/or microwave initiated reactions in accordance with one embodiment of the present invention.

As shown in the embodiment depicted in FIG. 7, reactor 70 of the present invention may be used in connection with ultraviolet (UV) initiated reactions, such as, photo-polymerization, water treatment or disinfection, or organic reactions for the production of clinical drugs. In addition, reactor 70 may also be used in connection with microwave initiated reactions. In particular, microwave energy may be used as a source for providing heat and as a stimulating agent for organic reactions, particularly for those involving coal slurry, liquid organics, pharmaceuticals, and converting saw dust and other wood based products into cellulose. Microwave energy may also be used for energy efficient evaporation of water, desalination processes, carbon dioxide capture and sequestration purposes. It may be noted that energy from, for instance, microwaves and UV waves, may act to destroy pathogens and bacteria in fluid. Other sources of energy as also possible as this invention is not intended to be limited in this manner.

For use in desalination and treatment of water using microwaves, reactor 70 may be set up in substantially the same manner as described in connection with FIG. 1. In an embodiment, salty liquid may be introduced through pathway 102 and distributed by the first rotatable member 103 on to and uniformly along the heated inner surface 123 of outer vessel 11. At about the same time, a relatively cool liquid may be introduced through tube 104 into inner vessel 15. This fluid may subsequently be directed into the second rotatable member 105 and subsequently distributed on to and substantially uniformly along the inner surface 172 of inner vessel 15.

As the substantially uniform thin film of the salty liquid travels along inner surface 123 of vessel 11, an energy source, such as a microwave generating device 71, positioned about the body portion 12 of outer vessel 11, may be activated to transmit microwave radiation through the walls of the body portion 12 to heat the salty fluid flowing along the inner surface 123 of vessel 11. This causes the thin film of salty fluid to vaporize. It should be appreciated that when using an energy source, such as a microwave generator 71, where the energy needs to act on the fluid being processed in the outer vessel 11, but need not act on the heat exchange fluid in the inner vessel 15, the body portion 12 of the outer vessel 11 may be made from a material that permits such energy to pass therethrough, while the inner vessel 15 can be made from a material that may be impervious to such energy.

The vapor generated may then travel across the annular space 16 towards the relatively cool outer surface 171 of inner vessel 15. Upon contact with the relatively cool outer surface 171, the vapor may condense into a liquid and may travel down the outer surface 171 of the inner vessel 15. The condensed liquid may subsequently be collected from within the bottom portion 13 of the outer vessel 11. In an embodiment, the process may be carried out with the annular space 16 under a vacuum condition. Alternatively, the process may be carried out at atmospheric or above atmospheric condition.

It should be appreciated that the not all of the fluid heated by the microwave radiation. As such, the heated fluid flowing along the inner surface 123 of outer vessel 11 may be collected through outlet 132 on the bottom portion 13 and recycled back into the outer vessel 11 through pathway 102. In this way, after the process has been initiated, not as much energy may be needed from the microwave source 71 to heat the salty fluid being processed. As a result, this design can provide a substantially energy efficient system for distillation.

In certain instances, in addition to the utilization of microwave radiation, ultraviolet (UV) radiation may also be used to destroy any pathogens or bacteria that may be present in the fluid being processed.

Example 5

Carbon Dioxide Removal

For use in carbon dioxide capture and sequestration purposes, any of the reactors shown above, including those illustrated in FIGS. 1, 2 and 3, may be used in substantially the same manner as described above.

In an embodiment, using a liquid (e.g., amine solution) capable of absorbing gaseous carbon dioxide, a pool of such liquid may be exposed to an environment containing gaseous carbon dioxide in order to absorb the carbon dioxide into the liquid and remove it from the environment. Once saturated with the carbon dioxide, the liquid may be introduced through pathway 102 and distributed by the first rotatable member 103 on to and uniformly along the heated inner surface 123 of outer vessel 11. At about the same time, an ascending counter-current gas flow capable of absorbing carbon dioxide may be introduced into the annular space 16.

As the substantially uniform thin film of the saturated liquid travels along inner surface 123 of vessel 11, a heating device 71, such as a microwave or fluid pipes, positioned about the body portion 12 of outer vessel 11, may be activated to heat the saturated fluid flowing along the inner surface 123 of vessel 11. The counter-current gas flow, on the other hand, may be maintained a relatively cooler temperature. To do so, a relatively cool liquid may be introduced through tube 104 into inner vessel 15. This fluid may subsequently be directed into the second rotatable member 105 and subsequently distributed on to and substantially uniformly along the inner surface 172 of inner vessel 15.

As the ascending counter-current gas flow comes into contact with the heated saturated liquid, the counter-current gas may interact with the saturated liquid and absorb the carbon dioxide from the liquid. The liquid may then continue to move down the inner surface 123 and directed out through outlet 132 at the bottom portion 13 of outer vessel 11, where it can be collected or recycled back into pathway 102. As for the ascending counter-current gas flow now saturated with carbon dioxide, it can be removed through exhaust 142 in the top portion 14 of outer vessel 11. The gas flow saturated with carbon dioxide can subsequently be mixed with other liquids or materials to produce a carbonated product.

Example 6

Figure 8:
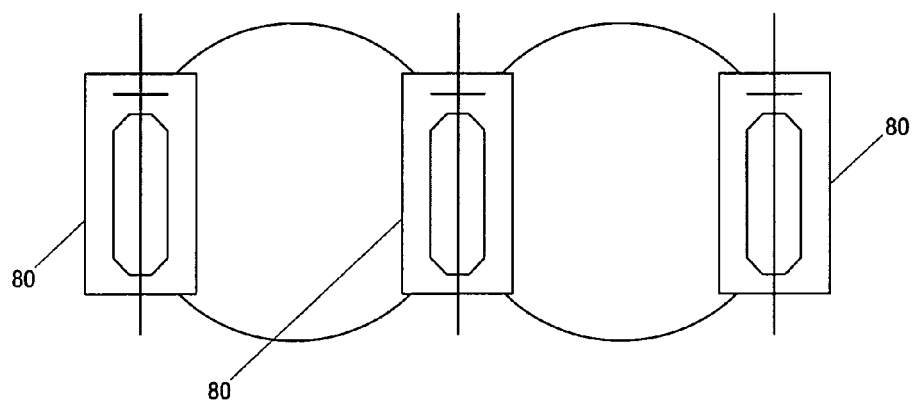
FIGS. 8 and 9 illustrate additional embodiments of the reactor of the present invention.

In an embodiment, as illustrated in FIG. 8, reactors 80, similar to any of the reactors illustrated in FIGS. 1-7 may be positioned in series and may be designed to be in fluid communication with one another, so that any of the applications described above can be carried out continuously in series or to allow multiple passes of the fluid through the same or similar reactor design. It should be noted, that any possible combination of reactors can be established in series and the series may not be limited to any maximum number of reactors.

Figure 9:
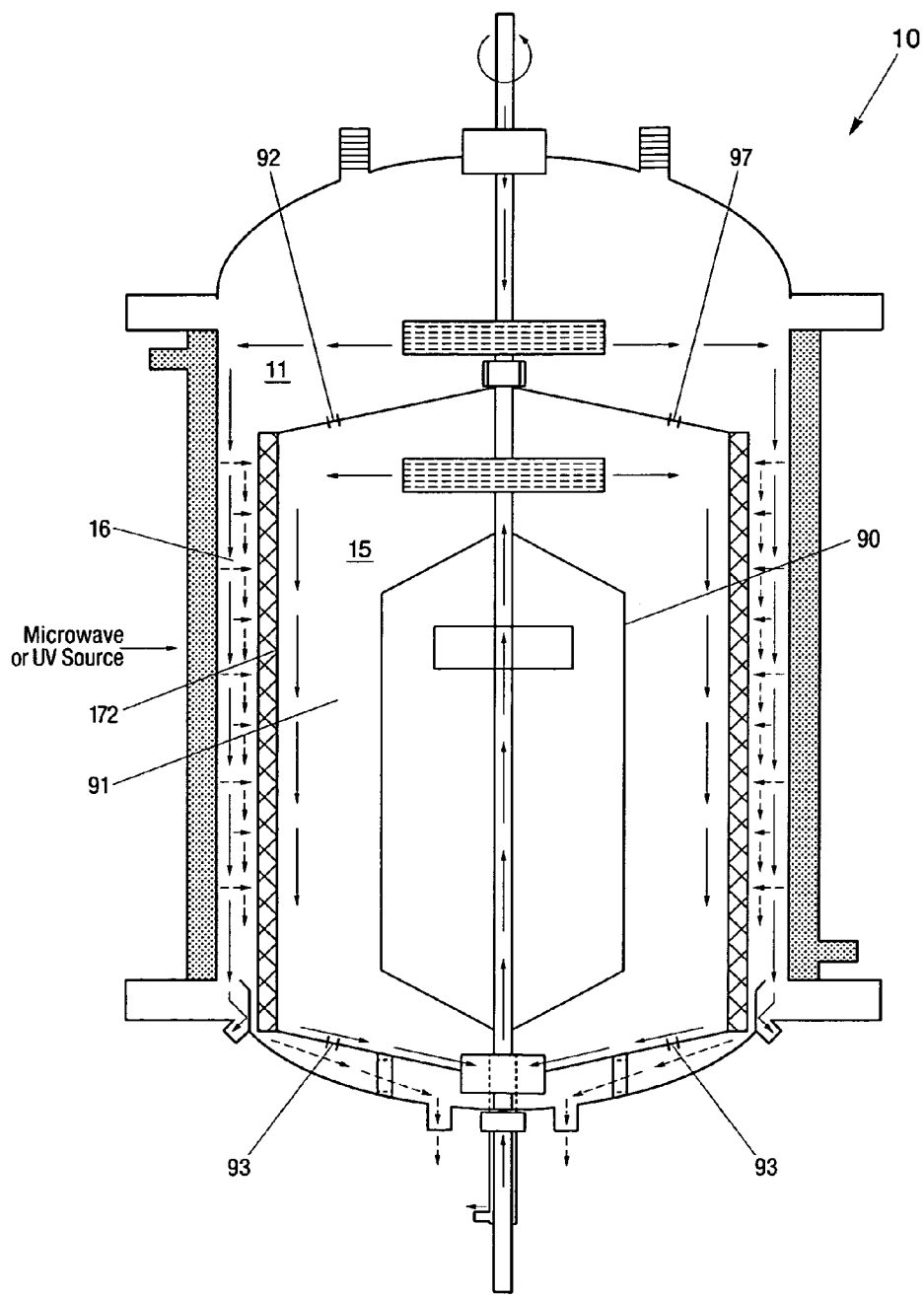

In a further embodiment, as shown in FIG. 9, instead of providing the reactor in series, the reactor 10 of the present invention can be designed to include at least a third vessel 90 that may be situated within the inner vessel 15 to provide a second annular space 91 between an outer surface of the third vessel 90 and an inner surface 172 of the inner vessel 15. In this design, the fluid and/or gas flowing along the annular space 16 between the outer vessel 11 and the inner vessel 15, once outside of that annular space 16, can be redirected into the annular space 91 positioned between the inner vessel 15 and the third vessel 90 within the inner vessel 15. The redirection can be accomplished through openings 92 on the top end 19 and openings 93 on the bottom end 18 of the inner vessel 15. This design can allow the fluid being processed with multiple passes through the reactor 10 to enhance transport rates. It should be noted that a fourth vessel can also be situated within the third vessel to provide a third annular space. This design can be repeated with an additional fifth, sixth or any additional vessels, as necessary.

Of course, if multiple passes is desired, the fluid and/or gas captured from annular space 16 in any of the reactors in FIGS. 1-7 can be recycled back into the annular space 16 for as many passes as necessary.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

The invention claimed is:

1. A reactor comprising:
an outer vessel having an inner surface against which a fluid being processed can be accommodated;
an inner vessel, situated within the outer vessel, and having an outer surface serving as a heat exchange surface for the fluid being processed; and
an annular space defined between the outer vessel and the inner vessel for providing a pathway along which processing of the fluid can be implemented, the annular space being designed to maintain a temperature differential between the outer vessel and the inner vessel to impart the fluid being processed with relatively high transport rates.

2. A reactor as set forth in claim 1, wherein the inner surface of the outer vessel is designed to allow fluid being processed to descend in a substantially uniform thin film.

3. A reactor as set forth in claim 2, wherein in the substantially uniform thin film permits the fluid be processed to be well suited for treatment, processing, and/or separation.

4. A reactor as set forth in claim 2, wherein the substantially uniform thin film permits the fluid being processed with a relatively high rate of one of thermal transfer, mass transfer, mixing, or a combination thereof.

5. A reactor as set forth in claim 1, wherein the inner surface of the outer vessel can be provided with a profiled pattern to create additional surface area over which the fluid being processed can flow to facilitate one of treatment, processing, separation, an increase in residence time within the annular space, or a combination thereof.

6. A reactor as set forth in claim 1, wherein the inner surface of the outer vessel can be coated to facilitate treatment, processing, and/or separation of the fluid being processed.

7. A reactor as set forth in claim 1, wherein the outer vessel also includes a bottom portion designed to collect and remove the fluid being processed that has descended from the inner surface.

8. A reactor as set forth in claim 1, wherein the inner vessel includes an inner surface along which a heat exchange fluid may flow.

9. A reactor as set forth in claim 8, wherein the heat exchange fluid has a temperature different from that of the fluid being processed to impart a temperature differential between the outer surface of the inner vessel and the inner surface of the outer vessel.

10. A reactor as set forth in claim 8, wherein the inner surface of the inner vessel can be provided with a profiled pattern to increase surface tension, so as to impart and maintain a substantially thin and uniform film of the heat exchange fluid.

11. A reactor a set forth in claim 8, wherein the inner vessel also includes a bottom end designed to collect and remove the heat exchange fluid that has descended from the inner surface.

12. A reactor as set forth in claim 1, wherein the annular space is designed to permit a second fluid to be directed into the annular space for interacting with the fluid being processed.

13. A reactor as set forth in claim 12, wherein the second fluid can act to increase points of contacts at an interface between the second fluid and the fluid being processed over a relatively large surface area within the annular space to impart the fluid being processed with relatively high transport rates.

14. A reactor as set forth in claim 1, wherein the annular space is designed to permit a second fluid to be directed into the annular space in a counter-current manner relative to the fluid being processed for interacting with the fluid being processed.

15. A reactor as set forth in claim 1, wherein the annular space is provided with a relatively short distance between the inner surface of the outer vessel and the outer surface of the inner vessel in order to impart the fluid being processed with relatively high transport rates.

16. A reactor as set forth in claim 1, further including a fluid dispensing system to permit introduction of the fluid being processed onto the inner surface of the outer vessel and the inner surface of the inner vessel.

17. A reactor as set forth in claim 16, wherein the fluid dispensing system includes a rotating member within the outer vessel for generating substantially fine droplets or fiber-like elements from the fluid being processed, such that a substantially uniform thin film of the fluid being processed can be provided on to the inner surface of the outer member.

18. A reactor as set forth in claim 16, wherein the fluid dispensing system includes a rotating member within the inner vessel for generating substantially fine droplets or fiber-like elements from the heat exchange fluid, such that a substantially uniform thin film of the heat exchange fluid can be provided on to the inner surface of the inner member.

19. A reactor as set forth in claim 1, further including an energy source provided about the outer vessel to act as a source for heating or cooling the fluid being processed along the inner surface of the outer vessel.

20. A reactor as set forth in claim 1, further including a bed of packing material within the annular space to increase surface area over which a volume of the fluid being processed can come into contact to enhance its transport rates.

21. A reactor as set forth in claim 20, wherein the bed of packing material can provide a substantially uniform temperature distribution across the annular space.

22. A reactor as set forth in claim 1, further including a third vessel situated within the inner vessel, so as to provide another annular space between the third vessel and the inner vessel permit the fluid being processed multiple passes through the reactor to enhance transport rates.

23. A system for processing fluid wherein a plurality of the reactors of claim 1 are connected in series to permit the fluid being processed with multiple passes through the reactors to enhance transport rates.

24. A system as set forth in claim 23, wherein each reactor is designed to process the fluid being processed differently.

25. A method for processing a fluid, the method comprising:
- introducing into an outer vessel and against its inner surface a fluid being processed;
- providing, within the outer vessel, an inner vessel with a heat exchange surface at a temperature different than that of the fluid being processed; and
- maintaining a temperature differential across a pathway between the outer vessel and the inner vessel to impart to the fluid being processed therein relatively high transport rates.

26. A method as set forth in claim 25, wherein the step of introducing includes generating a substantially uniform thin film flow of the fluid being processed against the inner surface of the outer vessel.

27. A method as set forth in claim 26, wherein, in the step of generating, the substantially uniform thin film flow enhances ability of the fluid to be treated, processed, and/or separated.

28. A method as set forth in claim 26, wherein the step of generating includes permitting the fluid being processed to have a relatively high rate of thermal transfer, mass transfer, mixing, or a combination thereof.

29. A method as set forth in claim 26, wherein the step of generating includes rotationally dispensing within the outer vessel substantially fine droplets or fiber-like elements of the fluid being processed.

30. A method as set forth in claim 25, wherein the step of introducing includes imparting the inner surface of the outer vessel with a profiled pattern to create additional surface area over which the fluid being processed can flow to facilitate one of treatment, processing, separation, increase in residence time of the fluid being treated within the pathway, or a combination thereof.

31. A method as set forth in claim 25, wherein the step of introducing includes coating the inner surface of the outer vessel to facilitate treatment, processing, and/or separation of the fluid being treated.

32. A method as set forth in claim 25, wherein the step of providing includes distributing against an inner surface of the inner vessel a heat exchange fluid at a temperature different than that of the fluid being processed.

33. A method as set forth in claim 32, wherein the step of distributing includes creating a temperature differential between the outer surface of the inner vessel and the inner surface of the outer vessel.

34. A method as set forth in claim 29, wherein the step of distributing includes rotationally dispensing within the inner vessel substantially fine droplets or fiber-like elements of the heat exchange fluid.

35. A method as set forth in claim 25, wherein the step of providing includes providing the inner surface of the inner vessel with a profiled pattern to increase surface tension, so as to impart and maintain a substantially thin and uniform film of the heat exchange fluid.

36. A method as set forth in claim 25, further including directing a second fluid into the pathway between the outer vessel and the inner vessel to permit interaction with the fluid being processed.

37. A method as set forth in claim 36, wherein the step of directing includes increasing points of contact at an interface between the second fluid and the fluid being processed over a relatively large surface area within the pathway to impart the fluid being processed with relatively high transport rates.

38. A method as set forth in claim 36, wherein the step of directing includes allowing the second fluid to move within the pathway in a counter-current manner relative to the fluid being processed.

39. A method as set forth in claim 25, wherein the step of maintaining includes providing the pathway with a relatively short distance between the outer surface of the inner vessel and the inner surface of the outer vessel in order to impart the fluid being processed with relatively high transport rates.

40. A method as set forth in claim 25, further including heating or cooling the fluid being processed along the inner surface of the outer vessel.

41. A method as set forth in claim 25, further placing a bed of a packing material within the pathway between the outer vessel and the inner vessel to increase surface area over which the fluid being processed can come into contact to enhance its transport rates.

42. A method as set forth in claim 41, wherein, in the step of placing, a volume of the fluid being processed is introduced into the outer vessel.

43. A method as set forth in claim 41, wherein the step of placing includes utilizing the bed of packing material to provide a substantially uniform temperature distribution across the pathway between the outer vessel and the inner vessel.

44. A method as set forth in claim 25, wherein the fluid being processed is utilized in fluid-fluid reactions in connection with organic systems.

45. A method as set forth in claim 25, wherein the fluid being processed is utilized in a distillation or an evaporation process.

46. A method as set forth in claim 25, wherein the fluid being processed is superheated steam being deheated or cooled.

47. A method as set forth in claim 25, wherein the fluid being processed is utilized in ultraviolet and/or microwave initiated reactions.

48. A method as set forth in claim 25, wherein the fluid being processed is utilized in a desalination process.

49. A method as set forth in claim 25, wherein the fluid being processed is saturated with carbon dioxide and is being utilized in a carbon dioxide removal process.

* * * * *